United States Patent
Li et al.

(10) Patent No.: US 11,818,546 B2
(45) Date of Patent: Nov. 14, 2023

(54) HEARING AID FUNCTION REALIZATION METHOD BASED ON WEARABLE DEVICE SYSTEM AND WEARABLE DEVICE

(71) Applicant: Shenzhen Tingduoduo Technology Co., Ltd., Shenzhen (CN)

(72) Inventors: Gaofeng Li, Shenzhen (CN); Jian Sun, Shenzhen (CN)

(73) Assignee: SHENZHEN TINGDUODUO TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/319,669

(22) Filed: May 18, 2023

(65) Prior Publication Data

US 2023/0292062 A1    Sep. 14, 2023

(30) Foreign Application Priority Data

May 18, 2022    (CN) .......................... 202210537029.8

(51) Int. Cl.
*H04R 25/00*    (2006.01)
*H04R 1/10*    (2006.01)

(52) U.S. Cl.
CPC ......... *H04R 25/505* (2013.01); *H04R 1/1041* (2013.01); *H04R 1/1083* (2013.01); *H04R 25/353* (2013.01); *H04R 25/554* (2013.01); *H04R 2225/41* (2013.01); *H04R 2225/43* (2013.01); *H04R 2430/01* (2013.01)

(58) Field of Classification Search
CPC .. H04R 25/505; H04R 1/1041; H04R 25/353; H04R 1/1083; H04R 25/554; H04R 2225/41; H04R 2225/43; H04R 2430/01

USPC ......................................................... 381/315
See application file for complete search history.

(56) References Cited

U.S. PATENT DOCUMENTS

2023/0217195 A1* 7/2023 Poltorak .............. H04R 25/606
                                                                    381/315

FOREIGN PATENT DOCUMENTS

| CN | 101593522 A | 12/2009 |
| CN | 103905945 A | 7/2014 |
| CN | 104521247 A | 4/2015 |
| CN | 104869517 A | 8/2015 |

(Continued)

OTHER PUBLICATIONS

CNIPA, Notification of First Office Action for Chinese application CN202210537029.8, dated Jun. 24, 2022.

(Continued)

*Primary Examiner* — Phylesha Dabney
(74) *Attorney, Agent, or Firm* — Zhigang Ma

(57) ABSTRACT

The present invention discloses a hearing aid function realization method based on a wearable device system and a wearable device. The method comprises: collecting external sound signals based on a microphone on a wearable device, and inputting the collected external sound signals into pre-installed hearing aid software; processing the external sound signals based on the hearing aid software to obtain the processed sound signals, wherein the processed sound signals meet the hearing aid needs of hearing-impaired users; and transmitting the processed sound signals to a Bluetooth headset connected with a Bluetooth module based on the Bluetooth module, so that the hearing-impaired users receive and listen to the processed sound signals based on the Bluetooth headset.

4 Claims, 4 Drawing Sheets

(56) References Cited

FOREIGN PATENT DOCUMENTS

| | | |
|---|---|---|
| CN | 109859767 A | 6/2019 |
| CN | 112367600 A | 2/2021 |
| CN | 113347300 A | 9/2021 |
| TW | 201422006 A | 6/2014 |

OTHER PUBLICATIONS

CNIPA, Notification of Second Office Action for Chinese application CN202210537029.8, dated Jul. 19, 2022.
CNIPA, Notification to grant patent right for Chinese application CN202210537029.8, dated Aug. 4, 2022.

* cited by examiner

HEARING AID FUNCTION REALIZATION METHOD BASED ON WEARABLE DEVICE SYSTEM AND WEARABLE DEVICE

TECHNICAL FIELD

The present invention relates to the technical field of hearing aid, in particular to a hearing aid function realization method based on a wearable device system and a wearable device.

BACKGROUND

At present, there are many hearing-impaired persons who cannot hear or clearly hear talking of other people, music and broadcast or various sounds such as alarm, doorbell, trumpet and prompting tone like normal people. At present, hearing impairment is difficult to cure and can only be solved by wearing hearing aids. At present, a key component in the hearing aid is a hearing aid chip which is responsible for moderately weakening useless background murmur and noise, realizing intelligence, i.e., amplifying as required (according to the degree of hearing loss of users), then making reverse correction according to the acoustic distortion of hearing-impaired users and finally inputting to a loudspeaker to restore to sound signals (or bone conduction mode: inputting to an oscillator to pass through cheek bone). This compensates for the hearing loss of the hearing-impaired users.

However, the current hearing aid chip is too expensive to be accepted by most hearing-impaired patients, so that the hearing aid chip cannot be popularized. Although the Bluetooth headset is modified in the prior art to become a hearing aid technology, generally the hearing aid chip is directly embedded into the Bluetooth headset, which also uses the hearing aid chip to achieve the hearing aid function so that the price is expensive.

Therefore, the prior art needs to be improved and enhanced.

SUMMARY

The technical problem to be solved in the present invention is to provide a hearing aid function realization method based on a wearable device system and a wearable device with respect to the above defects of the prior art, so as to solve the problems in the prior art that a hearing aid chip is expensive and cannot be accepted by most hearing-impaired users, and the existing hearing aid device also achieves the hearing aid function by using the hearing aid chip, and does not provide convenience for the hearing-impaired users.

To solve the above technical problems, the present invention adopts the following technical solutions:

In a first aspect, the present invention provides a hearing aid function realization method based on a wearable device system. The method comprises:
collecting external sound signals based on a microphone on a wearable device, and inputting the collected external sound signals into pre-installed hearing aid software;
processing the external sound signals based on the hearing aid software to obtain the processed sound signals, wherein the processed sound signals meet the hearing aid needs of hearing-impaired users;
transmitting the processed sound signals to a Bluetooth headset connected with a Bluetooth module based on the Bluetooth module, so that the hearing-impaired users receive and listen to the processed sound signals based on the Bluetooth headset;
wherein the hearing aid software comprises a hearing aid algorithm module which processes the external sound signals based on the hearing aid software to obtain the processed sound signals, comprising:
identifying a sound field based on the external sound signals, determining a sound field environment corresponding to the external sound signals, and determining an algorithm processing flow corresponding to the sound field environment to process the external sound signals based on the algorithm processing flow;
conducting real-time noise estimation processing and hierarchical noise suppression processing for the external sound signals through the identifying process of the sound field to improve the signal-to-noise ratio and intelligibility of the external sound signals;
conducting dynamic range compression processing for the external sound signals after real-time noise estimation processing and hierarchical noise suppression processing so that a sound frequency band corresponding to the external sound signals meets the hearing threshold range of the hearing-impaired users;
conducting spectrum shifting processing for the external sound signals after dynamic range compression processing to transfer high-frequency sound signals in the external sound signals to intermediate and low frequency regions;
conducting feedback suppression processing for the external sound signals after spectrum shifting processing for conducting wave trapping processing for detected howling frequency points to eliminate howl;
conducting gain amplification processing for the external sound signals after feedback suppression processing according to a set gain target to obtain the processed sound signals.

In one implementation mode, the method further comprises:
manufacturing the hearing aid algorithm module into a software application program in advance, and installing the software application program in a wearable device system.

In one implementation mode, identifying a sound field based on the external sound signals, determining a sound field environment corresponding to the external sound signals, and determining an algorithm processing flow corresponding to the sound field environment comprises:
conducting analogue-to-digital conversion for the external sound signals to obtain digital sound signals;
extracting the sound field characteristics from the digital sound signals, and determining the sound field environments corresponding to the sound field characteristics according to the sound field characteristics;
reading a preset algorithm library based on the sound field environments, and determining algorithm processing flows corresponding to the sound field environments, wherein a plurality of sound field environments and algorithm processing flows matched with the sound field environments are set in the algorithm library.

In one implementation mode, conducting dynamic range compression processing for the external sound signals after real-time noise estimation processing and hierarchical noise suppression processing so that a sound frequency band corresponding to the external sound signals meets the hearing threshold range of the hearing-impaired users comprises:

acquiring the frequency band information of the external sound signals after real-time noise estimation processing and hierarchical noise suppression processing;

limiting the maximum output power by compression so that the sound frequency band corresponding to the external sound signals meets the hearing threshold range of the hearing-impaired users.

In one implementation mode, the method further comprises:

receiving an input instruction of the user and starting the hearing aid software based on the input instruction, so that the hearing aid software process the external sound signals.

In a second aspect, embodiments of the present invention further provide a hearing aid function realization apparatus based on a wearable device system. The apparatus comprises:

a signal collecting module for collecting external sound signals based on a microphone on a wearable device and inputting the collected external sound signals into pre-installed hearing aid software;

a hearing aid algorithm module for processing the external sound signals based on the hearing aid software to obtain the processed sound signals, wherein the processed sound signals meet the hearing aid needs of hearing-impaired users;

a signal output module for transmitting the processed sound signals to a Bluetooth headset connected with a Bluetooth module based on the Bluetooth module, so that the hearing-impaired users receive and listen to the processed sound signals based on the Bluetooth headset;

wherein the hearing aid algorithm module comprises:

a sound field identifying unit for identifying a sound field based on the external sound signals, determining a sound field environment corresponding to the external sound signals, and determining an algorithm processing flow corresponding to the sound field environment to process the external sound signals based on the algorithm processing flow;

a noise suppression unit for conducting real-time noise estimation processing and hierarchical noise suppression processing for the external sound signals through the identifying process of the sound field to improve the signal-to-noise ratio and intelligibility of the external sound signals;

a dynamic range compression unit for conducting dynamic range compression processing for the external sound signals after real-time noise estimation processing and hierarchical noise suppression processing so that a sound frequency band corresponding to the external sound signals meets the hearing threshold range of the hearing-impaired users;

a spectrum shifting unit for conducting spectrum shifting processing for the external sound signals after dynamic range compression processing to transfer high-frequency sound signals in the external sound signals to intermediate and low frequency regions;

a feedback suppression unit for conducting feedback suppression processing for the external sound signals after spectrum shifting processing for conducting wave trapping processing for detected howling frequency points to eliminate howl;

a gain amplification unit for conducting gain amplification processing for the external sound signals after feedback suppression processing according to a set gain target to obtain the processed sound signals.

In one implementation mode, the apparatus further comprises:

a software manufacturing and installing module for manufacturing the hearing aid algorithm module into a software application program in advance and installing the software application program in a wearable device system.

In one implementation mode, the sound field identifying unit comprises:

a signal conversion subunit for conducting analogue-to-digital conversion for the external sound signals to obtain digital sound signals;

a sound field environment matching subunit for extracting the sound field characteristics from the digital sound signals and determining the sound field environments corresponding to the sound field characteristics according to the sound field characteristics;

an algorithm processing flow matching subunit for reading a preset algorithm library based on the sound field environments and determining algorithm processing flows corresponding to the sound field environments, wherein a plurality of sound field environments and algorithm processing flows matched with the sound field environments are set in the algorithm library.

In a third aspect, embodiments of the present invention further provide a wearable device which comprises a memory, a processor and a hearing aid function realization program based on a wearable device system stored in the memory and operated on the processor. When the processor executes the hearing aid function realization program based on the wearable device system, the steps of the hearing aid function realization method based on the wearable device system of any one of the above solutions are realized.

In a fourth aspect, embodiments of the present invention further provide a computer readable storage medium. The computer readable storage medium stores the hearing aid function realization program based on a wearable device system. When the hearing aid function realization program based on the wearable device system is executed by the processor, the steps of the hearing aid function realization method based on the wearable device system of any one of the above solutions are realized.

Beneficial effects: compared with the prior art, the present invention provides a hearing aid function realization method based on a wearable device system. The present invention firstly collects external sound signals based on a microphone on a wearable device, and inputs the collected external sound signals into pre-installed hearing aid software. Then, the present invention processes the external sound signals based on the hearing aid software to obtain the processed sound signals, wherein the processed sound signals meet the hearing aid needs of hearing-impaired users. Finally, the present invention transmits the processed sound signals to a Bluetooth headset connected with a Bluetooth module based on the Bluetooth module, so that the hearing-impaired users receive and listen to the processed sound signals based on the Bluetooth headset. The hearing aid software in the present invention comprises the hearing aid algorithm module. The hearing aid algorithm module can conduct sound field identification, noise suppression, dynamic range compression, spectrum shifting, feedback suppression and gain amplification for the external sound so that the processed sound signals can meet the hearing aid needs of the hearing-impaired users. Thus, the present invention can install the hearing aid software into the wearable device, so that the wearable device has the hearing aid function. Based on the hearing aid software, sound processing of the external sound signals can be realized and the external sound signals are transmitted to the Bluetooth headset through the Bluetooth module to meet the hearing aid needs of the hearing-impaired users, without using an expensive hearing aid chip and without any processing on the hardware of the wearable device, thereby bringing convenience to the hearing-impaired users.

DETAILED DESCRIPTION

To make the purpose, the technical solution and the effects of the present invention more clear, the present invention is further described below in detail with reference to the drawings and the listed embodiments. It should be understood that specific embodiments described herein are only used for explaining the present invention, not used for limiting the present invention.

The present embodiment provides a hearing aid function realization method based on a wearable device system. Through the method of the present embodiment, the wearable device has the hearing aid function, and without using the existing expensive hearing aid chip, only the hearing aid software is installed on the wearable device to meet the hearing aid needs of the hearing-impaired users. In specific implementation, the present embodiment firstly collects external sound signals based on a microphone on a wearable device, and inputs the collected external sound signals into pre-installed hearing aid software. Then, the present embodiment processes the external sound signals based on the hearing aid software to obtain the processed sound signals, wherein the processed sound signals meet the hearing aid needs of hearing-impaired users. Finally, the present embodiment transmits the processed sound signals to a Bluetooth headset connected with a Bluetooth module based on the Bluetooth module, so that the hearing-impaired users receive and listen to the processed sound signals based on the Bluetooth headset. The hearing aid software in the present invention comprises the hearing aid algorithm module. The hearing aid algorithm module can conduct sound field identification, noise suppression, dynamic range compression, spectrum shifting, feedback suppression and gain amplification for the external sound so that the processed sound signals can meet the hearing aid needs of the hearing-impaired users. Thus, the present embodiment can install the hearing aid software into the wearable device, so that the wearable device has the hearing aid function. Based on the hearing aid software, sound processing of the external sound signals can be realized and the external sound signals are transmitted to the Bluetooth headset through the Bluetooth module to meet the hearing aid needs of the hearing-impaired users, without using an expensive hearing aid chip, thereby bringing convenience to the hearing-impaired users.

Figure 2:
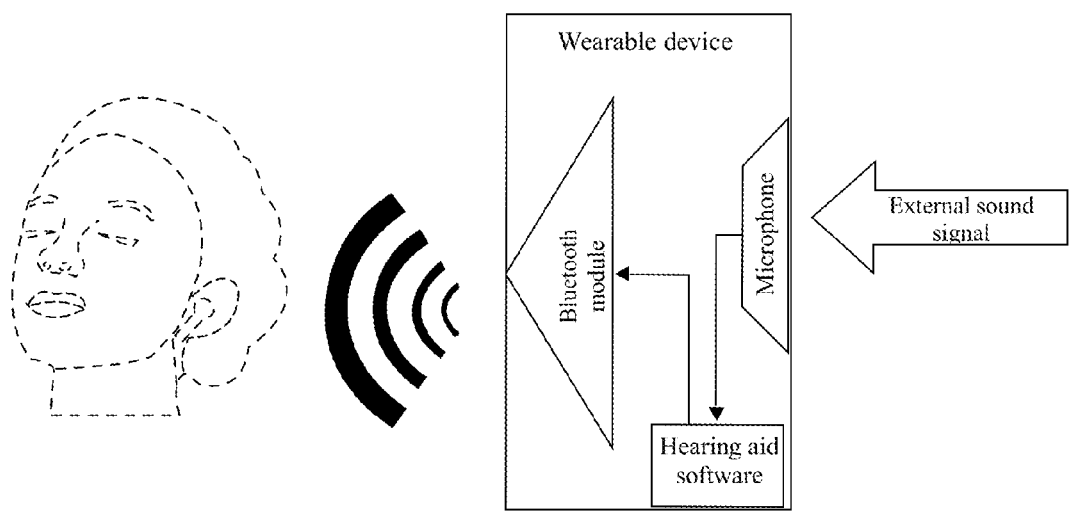
FIG. 2 is an application schematic diagram of a hearing aid function realization method based on a wearable device system provided by embodiments of the present invention.

For example, the wearable device in the present embodiment is a smart bracelet or smart watch. The smart bracelet is provided with a microphone which can be used for collecting the external sound signals, for example, for accepting surrounding environmental sounds including murmur, noise, speech sound of other people, music, etc. Hearing aid software is installed on the smart bracelet, and can be used for processing the external sound signals collected by the microphone. For example, as shown in FIG. 2, after the smart bracelet collects the external sound signals based on the microphone, the external sound signals are automatically inputted into the hearing aid software. The hearing aid software conducts sound field identification, noise suppression, dynamic range compression, spectrum shifting, feedback suppression and gain amplification successively for the external sound signals to obtain the processed sound signals. The processed sound signals are transmitted to a Bluetooth headset based on a Bluetooth module embedded in the smart bracelet, and the hearing-impaired user can hear the external sound by wearing the Bluetooth headset.

Exemplary method

Figure 1:
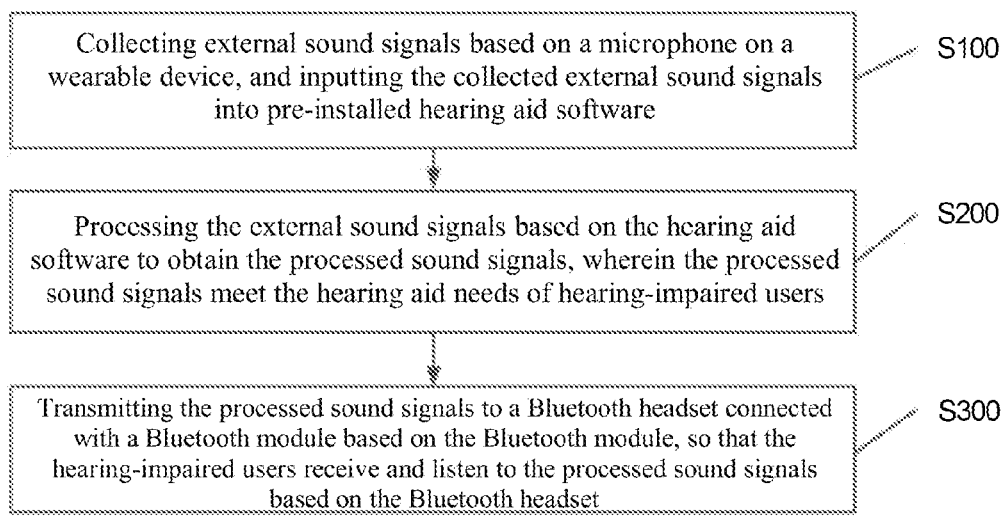
FIG. 1 is a flow chart of a specific implementation mode of a hearing aid function realization method based on a wearable device system provided by embodiments of the present invention.

The hearing aid function realization method based on the wearable device system in the present embodiment can be applied to wearable devices, and the wearable devices may be terminal devices such as smart bracelet, smart watch, VR glasses and mobile phones. The wearable device can be provided with Android or Mac OS system, and the wearable device is also provided with a microphone and a built-in Bluetooth module. Specifically, as shown in FIG. 1, the hearing aid function realization method based on the wearable device system in the present embodiment comprises the following steps:

Step S100: collecting external sound signals based on a microphone on a wearable device, and inputting the collected external sound signals into pre-installed hearing aid software.

In the present embodiment, the hearing aid software is pre-installed in the wearable device. A developer manufactures the hearing aid algorithm module into a software application program in advance and installs the software application program in a wearable device system. The hearing aid software realizes the whole hearing aid algorithm processing flow based on a mode of software running. In the present embodiment, the hearing aid software is provided with the hearing aid algorithm module. The hearing aid algorithm module can be used for processing the external sound signals, and the purpose of processing is to make the external sound heard by the hearing-impaired users. Thus, after the microphone on the wearable device collects the external sound signals, the collected external sound signals are inputted into the hearing aid software so that the hearing aid software processes the external sound signals.

In one implementation mode, the hearing aid software installed in the present embodiment can be started and closed based on the use demands of the user, that is, on-demand startup is realized. Specifically, the present embodiment can receive an input instruction of the user and start the hearing aid software based on the input instruction, so that the hearing aid software process the external sound signals. Of course, the hearing-impaired users hope that all the external sound signals can be automatically inputted into the hearing aid software for processing the sound signals. Thus, for the hearing-impaired users, as long as the hearing aid software is used for the first time and user registration is completed in the hearing aid software, the hearing aid software is always in an operating state. In this way, whenever and wherever the microphone receives the external sound signals, the microphone can automatically input the external sound signals into the hearing aid software, so that all the external sound signals can be heard by the hearing-impaired user.

In addition, to ensure that all the external sound signals are automatically inputted into the hearing aid software, a unique and independent communication channel is established between the microphone and the hearing aid software in the present embodiment, and the hearing aid software automatically acquires a permission to access the microphone when installed. In addition, the microphone is also controlled to be always in the operating state in the present embodiment to ensure that the microphone and the hearing aid software are operated synchronously, which is favorable for meeting the hearing aid needs of the hearing impaired users. In the present embodiment, the hearing aid software can be installed when the wearable device leaves the factory, and can also be purchased and downloaded from the App Store in the subsequent use process of the user. In this way, the hearing-impaired users can meet the hearing aid function without purchasing an expensive hearing aid, and can also purchase as required, thereby providing great convenience for the hearing-impaired users.

Step S200: processing the external sound signals based on the hearing aid software to obtain the processed sound signals, wherein the processed sound signals meet the hearing aid needs of hearing-impaired users.

In the present embodiment, the hearing aid software processes the external sound signals after receiving the external sound signals. Specifically, the hearing aid software in the present embodiment comprises a hearing aid algorithm module. The hearing aid algorithm module comprises a sound field identification unit, a noise suppression unit, a dynamic range compression unit, a spectrum shifting unit, a feedback suppression unit and a gain amplification unit. Namely, the six units are embedded in the hearing aid software so that the hearing aid software conducts sound field identification, noise suppression, dynamic range compression, spectrum shifting, feedback suppression and gain amplification successively for the external sound signals to obtain the processed sound signals.

In one implementation mode, the hearing aid software in the present embodiment comprises the following steps when processing the external sound signals:

Step S201: identifying a sound field based on the external sound signals, determining a sound field environment corresponding to the external sound signals, and determining an algorithm processing flow corresponding to the sound field environment to process the external sound signals based on the algorithm processing flow;

Step S202: conducting real-time noise estimation processing and hierarchical noise suppression processing for the external sound signals through the identifying process of the sound field to improve the signal-to-noise ratio and intelligibility of the external sound signals;

Step S203: conducting dynamic range compression processing for the external sound signals after real-time noise estimation processing and hierarchical noise suppression processing so that a sound frequency band corresponding to the external sound signals meets the hearing threshold range of the hearing-impaired users;

Step S204: conducting spectrum shifting processing for the external sound signals after dynamic range compression processing to transfer high-frequency sound signals in the external sound signals to intermediate and low frequency regions;

Step S205: conducting feedback suppression processing for the external sound signals after spectrum shifting processing for conducting wave trapping processing for detected howling frequency points to eliminate howl;

Step S206: conducting gain amplification processing for the external sound signals after feedback suppression processing according to a set gain target to obtain the processed sound signals.

Specifically, in the present embodiment, the hearing aid software conducts analogue-to-digital conversion for the external sound signals to obtain digital sound signals. Next, the present embodiment extracts the sound field characteristics from the digital sound signals, and determines the sound field environments corresponding to the sound field characteristics according to the sound field characteristics. In the present embodiment, the sound field environments are classified in advance, and sound field characteristics corresponding to each sound field environment are set. The sound field environments reflect the environments of the external sound signals at this time. For example, the sound field environments may be indoor environments or outdoor environments, or the sound field environments may be classified into restaurant environments, cinema environments and outdoor park environments based on the scenarios. After the sound field environment is determined based on the sound field characteristics, the present embodiment can read a preset algorithm library based on the sound field environment. In the present embodiment, a plurality of sound field environments and algorithm processing flows matched with the sound field environments are preset in the algorithm library. The algorithm processing flows comprise a noise suppression processing flow, a dynamic range compression processing flow, a spectrum shifting processing flow, a feedback suppression processing flow and a gain amplification processing flow. Because the algorithm processing flow corresponding to each sound field environment is preset in the algorithm library, a favorable basis is provided for subsequent sound signal processing. Because different sound field environments have different algorithm processing flows, the external sound signals can be processed individually. In addition, the sound field identification unit in the present embodiment is based on a simplified module obtained after big data training. The sound field environments are corresponding to the algorithm processing flows, which consumes very low resources and can extract the sound field characteristics to the maximum extent; and then the corresponding subsequent algorithm processing flows can be quickly matched.

In one implementation mode, in the present embodiment, after the sound field is identified for the external sound signals, real-time noise estimation processing and hierarchical noise suppression processing are conducted for the external sound signals through the identifying process of the sound field to improve the signal-to-noise ratio and intelligibility of the external sound signals. In the present embodiment, the noise suppression unit in the hearing aid software adaptively and rapidly tracks the change of environmental noise, suppresses the noise, and especially processes some unsteady noise difficult to process. The noise suppression unit can reach small delay and achieve good tracking and processing effects. The signal-to-noise ratio and the intelligibility of the sound signals processed by the noise suppression unit are greatly improved.

In one implementation mode, in the present embodiment, after noise suppression is completed, dynamic range compression processing is conducted for the external sound signals after real-time noise estimation processing and hierarchical noise suppression processing so that a sound frequency band corresponding to the external sound signals meets the hearing threshold range of the hearing-impaired users. Specifically, the present embodiment acquires the frequency band information of the sound signals after real-time noise estimation processing and hierarchical noise suppression processing. Then, the present embodiment limits the maximum output power by compression to maximally compress the sound to the hearing threshold range of the hearing-impaired users so that the sound frequency band corresponding to the external sound signals can be heard by the hearing-impaired users.

In one implementation mode, in the present embodiment, after dynamic range compression is completed, spectrum shifting processing is conducted for the external sound signals after dynamic range compression processing to transfer high-frequency sound signals in the external sound signals to intermediate and low frequency regions. Specifically, the spectrum shifting processing flow in the present embodiment mainly aims at the hearing-impaired users with heavy losses in a high-frequency region or no residual hearing in the high-frequency region. High-frequency sound signals that cannot be received by the hearing-impaired users are transferred to the intermediate and low frequency regions with good residual hearing by means of frequency shifting. Namely, the high-frequency sound signals in the external sound signals are transferred to the intermediate and low frequency regions with good residual hearing, so as to achieve a better compensation effect. On the premise of not losing the sound information, the specific hearing-impaired users can hear the external sound signals. It is worth noting that the spectrum shifting processing flow in the present embodiment is only applicable to specific hearing-impaired people. Because spectrum shifting actually artificially changes the frequency of sound, sound distortion is perceived by the general population. Thus, a selection button can be set on the hearing aid software in the present embodiment to select the processing flow of a spectrum shifting unit to enable the hearing-impaired users to select the processing flow as required. Of course, user information needs to be registered when the hearing aid software is used for the first time in the present embodiment, and during registration, the hearing aid software can automatically detect the degree of hearing loss of the user based on hearing information inputted by the user, and can automatically open or close the processing flow of the spectrum shifting unit based on the degree of hearing loss.

In one implementation mode, in the present embodiment, after spectrum shifting processing is completed, feedback suppression processing is conducted for the external sound signals after spectrum shifting processing for conducting wave trapping processing for detected howling frequency points to eliminate howl. Because the distance between the microphone and the loudspeaker of the wearable device is too close to achieve complete isolation, it is easy to cause feedback howl when the gain of the external sound signals is large. Therefore, the present embodiment can detect howling points in the external sound signals, and can simultaneously detect 20 howling frequency points and conduct wave trapping processing (maximum 60 dB) to achieve the purpose of eliminating the howl.

In one implementation mode, after feedback suppression processing is completed, the present embodiment conducts gain amplification processing for the external sound signals after feedback suppression processing according to a set gain target to obtain the processed sound signals. The present embodiment presets the gain target, and then controls the amplitude of output gain for the external sound signals after feedback suppression processing according to the set gain target to realize the gain amplification processing.

Step S300: transmitting the processed sound signals to a Bluetooth headset connected with a Bluetooth module based on the Bluetooth module, so that the hearing-impaired users receive and listen to the processed sound signals based on the Bluetooth headset.

In the present embodiment, after the processed sound signals are obtained, the present embodiment transmits the processed sound signals to a Bluetooth headset connected with a Bluetooth module based on the Bluetooth module, so that the processed sound signals meet the hearing aid needs of the hearing-impaired users. The hearing-impaired users wear the Bluetooth headset to listen to the processed sound signals, as shown in FIG. 2. Of course, because the hearing aid algorithm module firstly conducts analogue-to-digital conversion for the external sound signals to convert to digital sound signals when processing the external sound signals, the hearing aid algorithm module conducts processing based on the digital sound signals. At this moment, after the hearing aid algorithm module completes the sound signal processing flow, the hearing aid algorithm module can also convert the digital sound signals into sound signals, and then transmit the sound signals to the Bluetooth headset.

In conclusion, the present embodiment firstly collects external sound signals based on a microphone on a wearable device, and inputs the collected external sound signals into pre-installed hearing aid software. Then, the present embodiment processes the external sound signals based on the hearing aid software to obtain the processed sound signals, wherein the processed sound signals meet the hearing aid needs of hearing-impaired users. Finally, the present embodiment transmits the processed sound signals to a Bluetooth headset connected with a Bluetooth module based on the Bluetooth module, so that the hearing-impaired users receive and listen to the processed sound signals based on the Bluetooth headset. The hearing aid software in the present embodiment comprises the hearing aid algorithm module. The hearing aid algorithm module can conduct sound field identification, noise suppression, dynamic range compression, spectrum shifting, feedback suppression and gain amplification for the external sound so that the processed sound signals can meet the hearing aid needs of the hearing-impaired users. Thus, the present embodiment can install the hearing aid software into the wearable device, so that the wearable device has the hearing aid function. Based on the hearing aid software, sound processing of the external sound signals can be realized and the external sound signals are transmitted to the Bluetooth headset through the Bluetooth module to meet the hearing aid needs of the hearing-impaired users, without using an expensive hearing aid chip and without any processing on the hardware of the wearable device, thereby bringing convenience to the hearing-impaired users.

Exemplary apparatus

Figure 3:
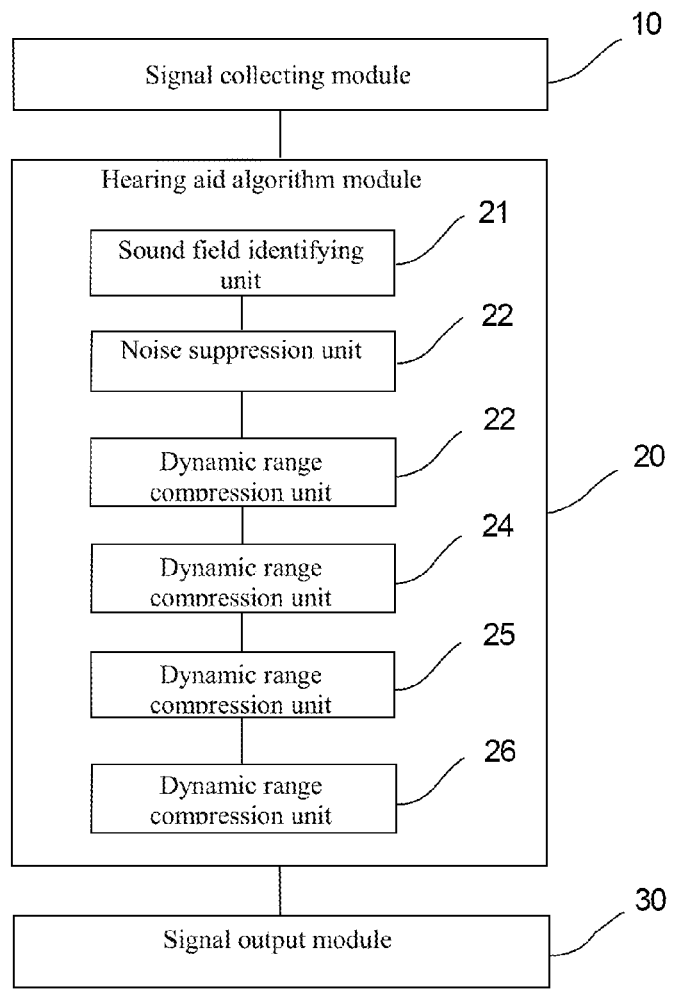
FIG. 3 is a schematic block diagram of a hearing aid function realization apparatus based on a wearable device system provided by embodiments of the present invention.

Based on the above embodiments, the present invention further discloses a hearing aid function realization apparatus based on a wearable device system. The hearing aid function realization apparatus based on the wearable device system is provided with a microphone which is used for collecting the external sound signals, and the hearing aid function realization apparatus based on the wearable device system has a built-in Bluetooth module which is connected with a Bluetooth headset. As shown in FIG. 3, the hearing aid function realization apparatus based on the wearable device system in the present embodiment comprises: a signal collecting module 10, a hearing aid algorithm module 20 and a signal output module 30. Specifically, the signal collecting module 10 is used for collecting external sound signals based on a microphone on a wearable device and inputting the collected external sound signals into pre-installed hearing aid software. The hearing aid algorithm module 20 is used for processing the external sound signals based on the hearing aid software to obtain the processed sound signals, wherein the processed sound signals meet the hearing aid needs of hearing-impaired users. The signal output module 30 is used for transmitting the processed sound signals to a Bluetooth headset connected with a Bluetooth module based on the Bluetooth module, so that the hearing-impaired users receive and listen to the processed sound signals based on the Bluetooth headset.

In one implementation mode, the hearing aid algorithm module 20 in the present embodiment comprises: a sound field identification unit 21, a noise suppression unit 22, a dynamic range compression unit 23, a spectrum shifting unit 24, a feedback suppression unit 25 and a gain amplification unit 26. Specifically, the sound field identifying unit 21 is used for identifying a sound field based on the external sound signals, determining a sound field environment corresponding to the external sound signals, and determining an algorithm processing flow corresponding to the sound field environment to process the external sound signals based on the algorithm processing flow. The noise suppression unit 22 is used for conducting real-time noise estimation processing and hierarchical noise suppression processing for the external sound signals through the identifying process of the sound field to improve the signal-to-noise ratio and intelligibility of the external sound signals. The dynamic range compression unit 23 is used for conducting dynamic range compression processing for the external sound signals after real-time noise estimation processing and hierarchical noise suppression processing so that a sound frequency band corresponding to the external sound signals meets the hearing threshold range of the hearing-impaired users. The spectrum shifting unit 24 is used for conducting spectrum shifting processing for the external sound signals after dynamic range compression processing to transfer high-frequency sound signals in the external sound signals to intermediate and low frequency regions. The feedback suppression unit 25 is used for conducting feedback suppression processing for the external sound signals after spectrum shifting processing for conducting wave trapping processing for detected howling frequency points to eliminate howl. The gain amplification unit 26 is used for conducting gain amplification processing for the external sound signals after feedback suppression processing according to a set gain target to obtain the processed sound signals.

In one implementation mode, the apparatus further comprises:
a software manufacturing and installing module for manufacturing the hearing aid algorithm module into a software application program in advance and installing the software application program in a wearable device system.

In one implementation mode, the sound field identifying unit 21 comprises:
a signal conversion subunit for conducting analogue-to-digital conversion for the external sound signals to obtain digital sound signals;
a sound field environment matching subunit for extracting the sound field characteristics from the digital sound signals and determining the sound field environments corresponding to the sound field characteristics according to the sound field characteristics;
an algorithm processing flow matching subunit for reading a preset algorithm library based on the sound field environments and determining algorithm processing flows corresponding to the sound field environments, wherein a plurality of sound field environments and algorithm processing flows matched with the sound field environments are set in the algorithm library.

In one implementation mode, the dynamic range compression unit 23 comprises:
a frequency band information acquiring subunit for acquiring the frequency band information of the external sound signals after real-time noise estimation processing and hierarchical noise suppression processing;
a frequency band compression subunit for limiting the maximum output power by compression so that the sound frequency band corresponding to the external sound signals meets the hearing threshold range of the hearing-impaired users.

The working principle of each module in the hearing aid realization apparatus based on the wearable device system in the present embodiment is the same as the principle of each step in the above method embodiments, and will not be repeated here.

Figure 4:
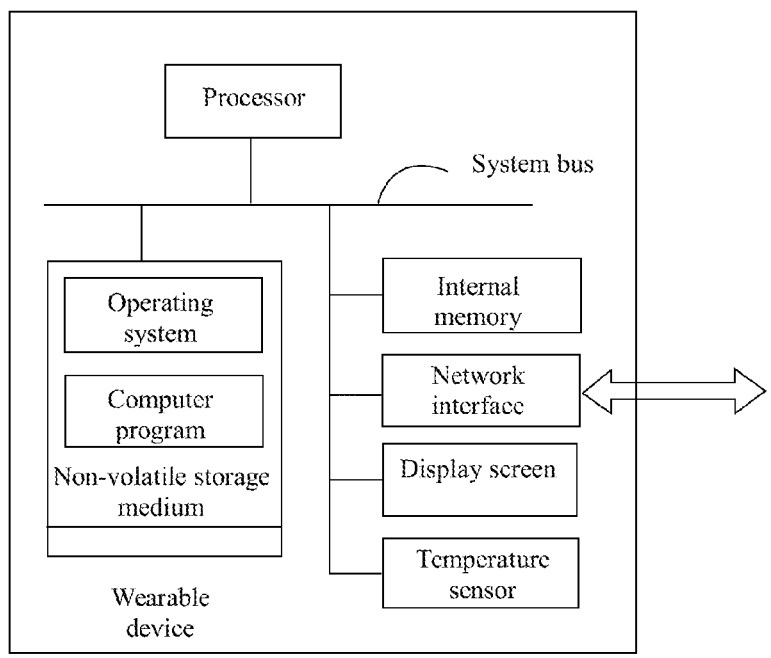
FIG. 4 is a schematic block diagram of a wearable device provided by embodiments of the present invention.

Based on the above embodiments, the present invention further provides a wearable device, and the wearable device may be terminal devices such as smart bracelet, smart watch, VR glasses and mobile phone. The wearable device can be provided with Android or Mac OS system, and the wearable device is also provided with a microphone and a built-in Bluetooth module. The microphone is used for collecting the external sound signals, and the Bluetooth module is connected with a Bluetooth headset. In addition, in the present embodiment, the wearable device is provided with hearing aid software; and the hearing aid software is provided with the hearing aid algorithm module. The hearing aid algorithm module can be used for processing the external sound signals, and the purpose of processing is to make the external sound heard by the hearing-impaired users. The schematic block diagram of the wearable device can be as shown in FIG. 4. The wearable device comprises a processor and a memory which are connected through a system bus, and the processor and the memory are arranged in a host, wherein the processor of the wearable device is used for providing computing and control capabilities. The memory of the wearable device comprises a non-volatile storage medium and an internal memory. The non-volatile storage medium stores an operating system and computer programs. The internal memory provides an environment for the operation of the operating system and the computer programs in the non-volatile storage medium. A network interface of the wearable device is connected and communicated with an external terminal through network communication. The computer programs are executed by the processor to realize a hearing aid function realization method based on a wearable device system.

Those skilled in the art can understand that the schematic block diagram shown in FIG. 4 is only a block diagram of a part of the structure related to the solution of the present invention, and does not limit the wearable device applied to the solution of the present invention; the specific wearable device may include more or fewer components than those shown in the figure, or combine certain components or have different component arrangement.

In an embodiment, a wearable device is provided; the wearable device comprises a memory, a processor and a hearing aid function realization method program based on a wearable device system stored in the memory and operated on the processor. When the processor executes the hearing aid function realization method program based on the wearable device system, the following operation instructions are realized:

Collecting external sound signals based on a microphone on a wearable device, and inputting the collected external sound signals into pre-installed hearing aid software;

Processing the external sound signals based on the hearing aid software to obtain the processed sound signals, wherein the processed sound signals meet the hearing aid needs of hearing-impaired users;

Transmitting the processed sound signals to a Bluetooth headset connected with a Bluetooth module based on the Bluetooth module, so that the hearing-impaired users receive and listen to the processed sound signals based on the Bluetooth headset;

Wherein the hearing aid software comprises a hearing aid algorithm module which processes the external sound signals based on the hearing aid software to obtain the processed sound signals, comprising:

Identifying a sound field based on the external sound signals, determining a sound field environment corresponding to the external sound signals, and determining an algorithm processing flow corresponding to the sound field environment to process the external sound signals based on the algorithm processing flow;

Conducting real-time noise estimation processing and hierarchical noise suppression processing for the external sound signals through the identifying process of the sound field to improve the signal-to-noise ratio and intelligibility of the external sound signals;

Conducting dynamic range compression processing for the external sound signals after real-time noise estimation processing and hierarchical noise suppression processing so that a sound frequency band corresponding to the external sound signals meets the hearing threshold range of the hearing-impaired users;

Conducting spectrum shifting processing for the external sound signals after dynamic range compression processing to transfer high-frequency sound signals in the external sound signals to intermediate and low frequency regions;

Conducting feedback suppression processing for the external sound signals after spectrum shifting processing for conducting wave trapping processing for detected howling frequency points to eliminate howl;

Conducting gain amplification processing for the external sound signals after feedback suppression processing according to a set gain target to obtain the processed sound signals.

Those ordinary skilled in the art can understand that all or some flows of the methods of the above embodiments can be implemented using hardware related to an instruction of the computer program, the computer program can be stored in a non-volatile computer readable storage medium, and the computer program may include the flows of the embodiments of the above methods when being executed, wherein any reference to the memory, storage, operation databases or other media used in the embodiments provided by the present invention may include non-volatile and/or volatile memories. The non-volatile memory may include a read-only memory (ROM), a programmable read-only memory (PROM), an electrically programmable ROM (EPROM), an electrically erasable programmable ROM (EEPROM) or a flash memory. The volatile memory may include a random access memory (RAM) or an external cache memory. As explanation rather than limitation, RAM is available in many forms, such as static RAM (SRAM), dynamic RAM (DRAM), synchronous DRAM (SDRAM), double data rate SDRAM (DDRSDRAM), enhanced SDRAM (ESDRAM), synchlink DRAM (SLDRAM), rambus direct RAM (RDRAM), direct rambus dynamic RAM (DRDRAM), and rambus dynamic RAM (RDRAM).

In conclusion, the present invention discloses a hearing aid function realization method based on a wearable device system and a wearable device. The method comprises: collecting external sound signals based on a microphone on a wearable device, and inputting the collected external sound signals into pre-installed hearing aid software; processing the external sound signals based on the hearing aid software to obtain the processed sound signals, wherein the processed sound signals meet the hearing aid needs of hearing-impaired users; transmitting the processed sound signals to a Bluetooth headset connected with a Bluetooth module based on the Bluetooth module, so that the hearing-impaired users receive and listen to the processed sound signals based on the Bluetooth headset. The present invention can install the hearing aid software into the wearable device, so that the wearable device has the hearing aid function. Based on the hearing aid software, sound processing of the external sound signals can be realized and the external sound signals are transmitted to the Bluetooth headset through the Bluetooth module, without using an expensive hearing aid chip, thereby bringing convenience to the hearing-impaired users.

Finally, it should be noted that the above embodiments are only used for describing the technical solution of the present invention rather than limitation. Although the present invention is described in detail by referring to the above embodiments, those ordinary skilled in the art should understand that: the technical solution recorded in each of the above embodiments can be still amended, or some technical features therein can be replaced equivalently. However, these amendments or replacements do not enable the essence of the corresponding technical solutions to depart from the spirit and the scope of the technical solutions of various embodiments of the present invention.

What is claimed is:

1. A hearing aid function realization method based on a wearable device system, comprising:
  collecting external sound signals based on a microphone on a wearable device, and inputting the collected external sound signals into pre-installed hearing aid software;
  processing the external sound signals based on the hearing aid software to obtain the processed sound signals, wherein the processed sound signals meet the hearing aid needs of hearing-impaired users;
  transmitting the processed sound signals to a Bluetooth headset connected with a Bluetooth module based on the Bluetooth module, so that the hearing-impaired users receive and listen to the processed sound signals based on the Bluetooth headset;
  wherein the hearing aid software comprises a hearing aid algorithm module which processes the external sound signals based on the hearing aid software to obtain the processed sound signals, comprising:
  identifying a sound field based on the external sound signals, determining a sound field environment corresponding to the external sound signals, and determining an algorithm processing flow corresponding to the sound field environment to process the external sound signals based on the algorithm processing flow;

conducting real-time noise estimation processing and hierarchical noise suppression processing for the external sound signals through the identifying process of the sound field to improve the signal-to-noise ratio and intelligibility of the external sound signals;

conducting dynamic range compression processing for the external sound signals after real-time noise estimation processing and hierarchical noise suppression processing so that a sound frequency band corresponding to the external sound signals meets the hearing threshold range of the hearing-impaired users;

conducting spectrum shifting processing for the external sound signals after dynamic range compression processing to transfer high-frequency sound signals in the external sound signals to intermediate and low frequency regions;

conducting feedback suppression processing for the external sound signals after spectrum shifting processing for conducting wave trapping processing for detected howling frequency points to eliminate howl;

conducting gain amplification processing for the external sound signals after feedback suppression processing according to a set gain target to obtain the processed sound signals;

the method further comprises:

manufacturing the hearing aid algorithm module into a software application program in advance, and installing the software application program in a wearable device system;

starting and closing the hearing aid software based on the use needs of the users, or for the hearing-impaired users, if the hearing aid software is used for the first time and user registration is completed in the hearing aid software, making the hearing aid software always in an operating state;

establishing a unique and independent communication channel between the microphone and the hearing aid software, automatically acquiring a permission to access the microphone by the hearing aid software when installed, and making the microphone always in the operating state to ensure that the microphone and the hearing aid software are operated synchronously;

identifying a sound field based on the external sound signals, determining a sound field environment corresponding to the external sound signals, and determining an algorithm processing flow corresponding to the sound field environment comprises:

classifying the sound field environments in advance, and setting sound field characteristics corresponding to each sound field environment, wherein the sound field environments reflect the environments of the external sound signals at this time;

conducting analogue-to-digital conversion for the external sound signals to obtain digital sound signals;

extracting the sound field characteristics from the digital sound signals, and determining the sound field environments corresponding to the sound field characteristics according to the sound field characteristics;

reading a preset algorithm library based on the sound field environments, and determining algorithm processing flows corresponding to the sound field environments, wherein a plurality of sound field environments and algorithm processing flows matched with the sound field environments are set in the algorithm library; wherein the algorithm processing flows comprise a noise suppression processing flow, a dynamic range compression processing flow, a spectrum shifting processing flow, a feedback suppression processing flow and a gain amplification processing flow; installing a selection button on the hearing aid software to select the processing flow of a spectrum shifting unit to enable the hearing-impaired users to select the processing flow as required; registering user information when the hearing aid software is used for the first time, and during registration, automatically detecting, by the hearing aid software, the degree of hearing loss of the user based on hearing information inputted by the user, and automatically opening or closing the processing flow of the spectrum shifting unit based on the degree of hearing loss;

conducting dynamic range compression processing for the external sound signals after real-time noise estimation processing and hierarchical noise suppression processing so that a sound frequency band corresponding to the external sound signals meets the hearing threshold range of the hearing-impaired users comprises:

acquiring the frequency band information of the external sound signals after real-time noise estimation processing and hierarchical noise suppression processing;

limiting the maximum output power by compression so that the sound frequency band corresponding to the external sound signals meets the hearing threshold range of the hearing-impaired users.

2. The hearing aid function realization method based on the wearable device system according to claim 1, further comprising:

receiving an input instruction of the user and starting the hearing aid software based on the input instruction, so that the hearing aid software process the external sound signals.

3. A hearing aid function realization apparatus based on a wearable device system, comprising:

a signal collecting module for collecting external sound signals based on a microphone on a wearable device and inputting the collected external sound signals into pre-installed hearing aid software;

a hearing aid algorithm module for processing the external sound signals based on the hearing aid software to obtain the processed sound signals, wherein the processed sound signals meet the hearing aid needs of hearing-impaired users;

a signal output module for transmitting the processed sound signals to a Bluetooth headset connected with a Bluetooth module based on the Bluetooth module, so that the hearing-impaired users receive and listen to the processed sound signals based on the Bluetooth headset;

wherein the hearing aid algorithm module comprises:

a sound field identifying unit for identifying a sound field based on the external sound signals, determining a sound field environment corresponding to the external sound signals, and determining an algorithm processing flow corresponding to the sound field environment to process the external sound signals based on the algorithm processing flow;

a noise suppression unit for conducting real-time noise estimation processing and hierarchical noise suppression processing for the external sound signals through the identifying process of the sound field to improve the signal-to-noise ratio and intelligibility of the external sound signals;

a dynamic range compression unit for conducting dynamic range compression processing for the external sound signals after real-time noise estimation processing and hierarchical noise suppression processing so that a sound frequency band corresponding to the external sound signals meets the hearing threshold range of the hearing-impaired users;

a spectrum shifting unit for conducting spectrum shifting processing for the external sound signals after dynamic range compression processing to transfer high-frequency sound signals in the external sound signals to intermediate and low frequency regions;

a feedback suppression unit for conducting feedback suppression processing for the external sound signals after spectrum shifting processing for conducting wave trapping processing for detected howling frequency points to eliminate howl;

a gain amplification unit for conducting gain amplification processing for the external sound signals after feedback suppression processing according to a set gain target to obtain the processed sound signals;

the apparatus further comprises:

a software manufacturing and installing module for manufacturing the hearing aid algorithm module into a software application program in advance and installing the software application program in a wearable device system;

the sound field identifying unit comprises:

a signal conversion subunit for conducting analogue-to-digital conversion for the external sound signals to obtain digital sound signals;

a sound field environment matching subunit for extracting the sound field characteristics from the digital sound signals and determining the sound field environments corresponding to the sound field characteristics according to the sound field characteristics;

an algorithm processing flow matching subunit for reading a preset algorithm library based on the sound field environments and determining algorithm processing flows corresponding to the sound field environments, wherein a plurality of sound field environments and algorithm processing flows matched with the sound field environments are set in the algorithm library;

the sound field identifying unit further comprises:

classifying the sound field environments in advance, and setting sound field characteristics corresponding to each sound field environment, wherein the sound field environments reflect the environments of the external sound signals at this time; and the algorithm processing flows comprise a noise suppression processing flow, a dynamic range compression processing flow, a spectrum shifting processing flow, a feedback suppression processing flow and a gain amplification processing flow;

installing a selection button on the hearing aid software to select the processing flow of a spectrum shifting unit to enable the hearing-impaired users to select the processing flow as required; registering user information when the hearing aid software is used for the first time, and during registration, automatically detecting, by the hearing aid software, the degree of hearing loss of the user based on hearing information inputted by the user, and automatically opening or closing the processing flow of the spectrum shifting unit based on the degree of hearing loss;

the dynamic range compression unit comprises: acquiring the frequency band information of the external sound signals after real-time noise estimation processing and hierarchical noise suppression processing; limiting the maximum output power by compression so that the sound frequency band corresponding to the external sound signals meets the hearing threshold range of the hearing-impaired users.

4. A computer readable storage medium, storing a hearing aid function realization program based on a wearable device system, wherein when the hearing aid function realization program based on the wearable device system is executed by a processor, the steps of the hearing aid function realization method based on the wearable device system of claim 1 are realized.

* * * * *